(No Model.) 3 Sheets—Sheet 1.
F. W. KOCH & S. GARRETT.
SLICING MACHINE.
No. 343,587. Patented June 15, 1886.
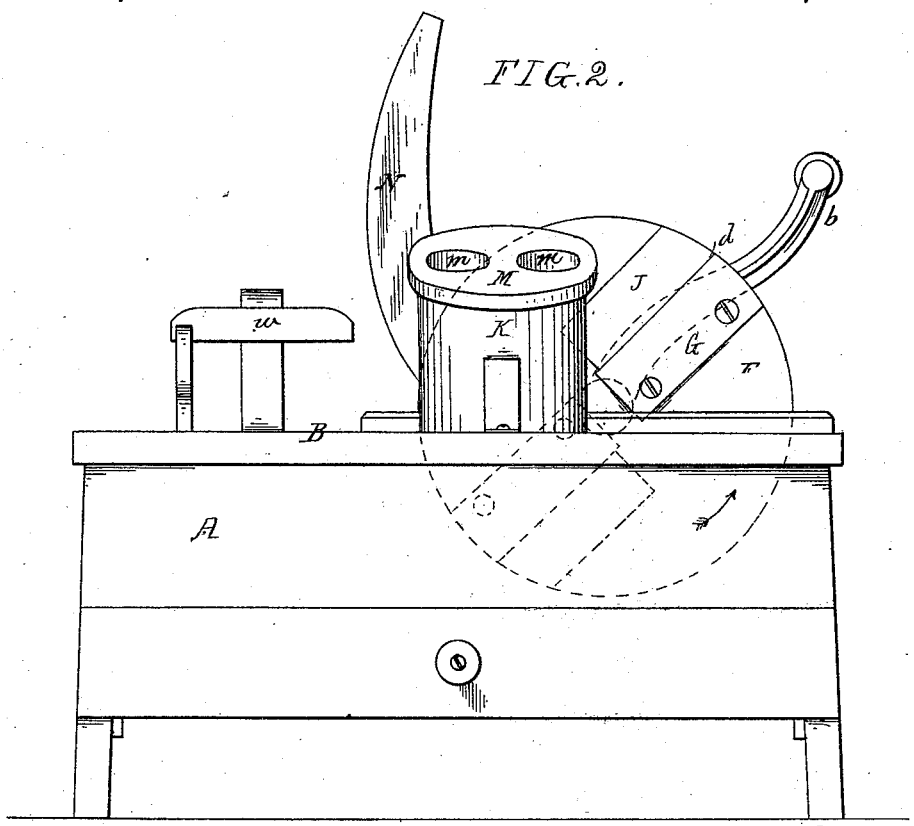
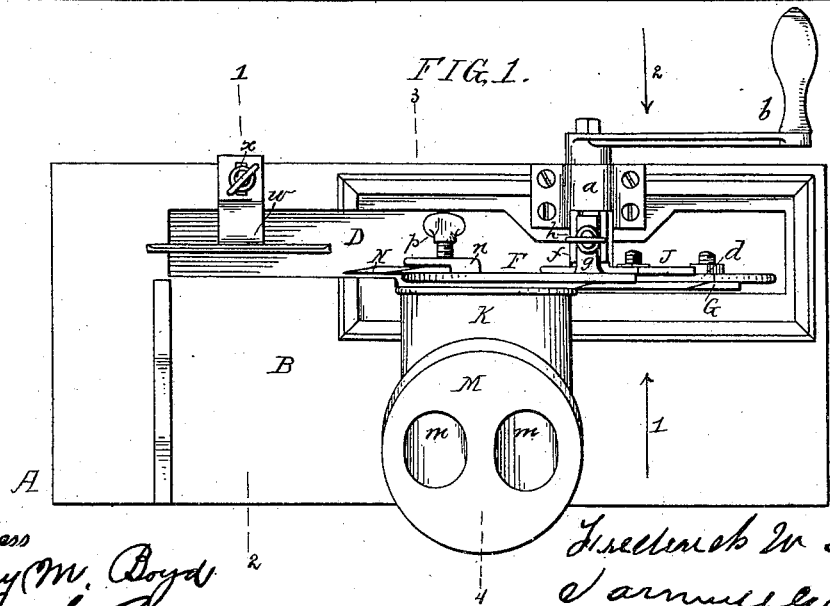

(No Model.)

F. W. KOCH & S. GARRETT.

SLICING MACHINE.

No. 343,587. Patented June 15, 1886.

Witnesses
William F. Davis
John E. Parker

Inventors
F. W. Koch & S. Garrett
by their Attorneys
Howson and Sons (No Model.) 3 Sheets—Sheet 3.

F. W. KOCH & S. GARRETT.
SLICING MACHINE.

No. 343,587. Patented June 15, 1886.

Witnesses:
William F. Davis
John E. Parker

Inventors
F. W. Koch & S. Garrett
by their Attorneys
Howson and Sons

UNITED STATES PATENT OFFICE.

FREDERICK W. KOCH AND SAMUEL GARRETT, OF STEELTON, PA.

SLICING-MACHINE.

SPECIFICATION forming part of Letters Patent No. 343,587, dated June 15, 1886.

Application filed August 13, 1885. Serial No. 174,337. (No model.)

*To all whom it may concern:*

Be it known that we, FREDERICK W. KOCH and SAMUEL GARRETT, of Steelton, in the county of Dauphin and State of Pennsylvania, have invented certain new and useful Improvements in a Machine for Slicing and Cutting, of which the following is a description.

Figure 3:
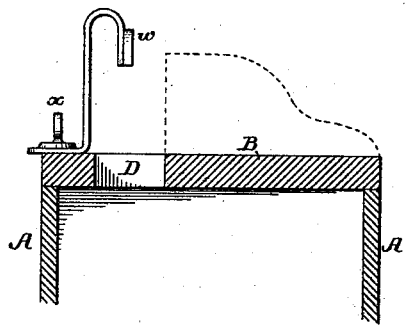
Figure 4:
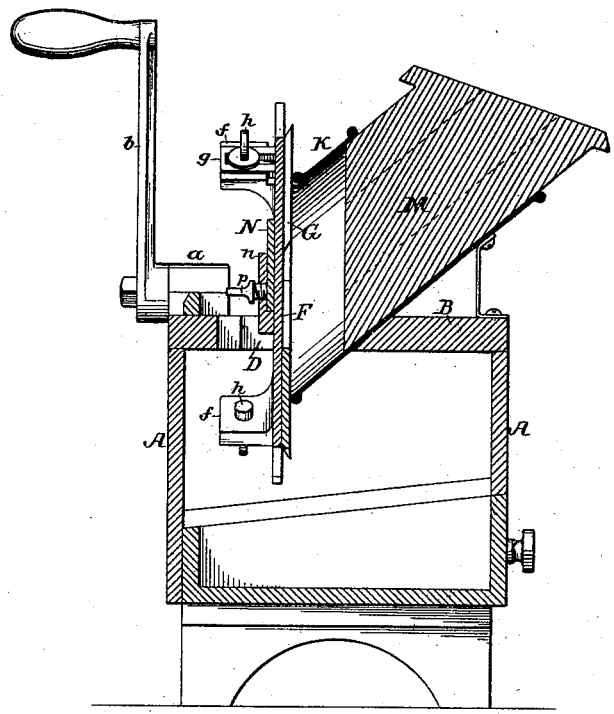
Figure 5:
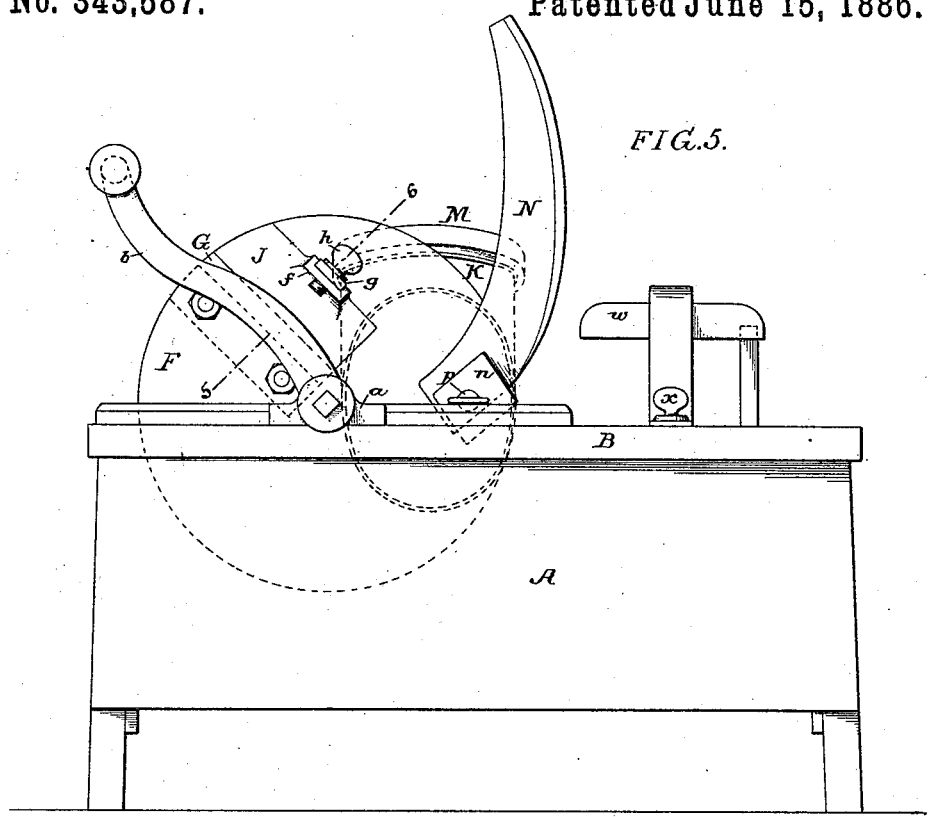
Figure 7:
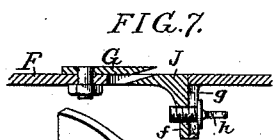
Figure 6:
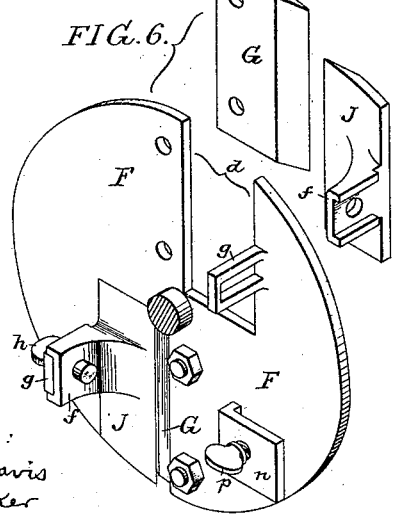
Figure 8:
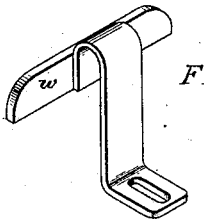

The object of our invention is to provide a slicing-machine having a wider range of usefulness than the ordinary machine, and this object we attain by constructing the machine in the manner hereinafter set forth, so that it is adapted for cutting bread, meat, vegetables, and other substances.
In the accompanying drawings, Figure 1 is a plan view of the machine; Fig. 2, a front view of the same, looking in the direction of the arrow 1, Fig. 1; Fig. 3, a transverse section on the line 1 2, Fig. 1; Fig. 4, a transverse section on the line 3 4, Fig. 1, with the plunger partially withdrawn; Fig. 5, a rear view of the machine looking in the direction of the arrow 2, Fig. 1; Fig. 6, a perspective view of the cutting-disk with one of the cutters and gage-plates detached therefrom; Fig. 7, a section on the line 5 6, Fig. 5; and Fig. 8, a perspective view of one of the gage-plates of the machine.

A is the main frame or box of the machine, in the top B of which is a longitudinal slot, D, for the reception of a disk, F, and cutting-knives carried thereby, the spindle of said disk being adapted to a bearing, *a*, on the top of the box, and being provided with a suitable operating-handle, *b*; or it may be furnished with a suitable belt-pulley if the machine is to be run by power. If desired, the spindle may pass through the disk and have bearings on both sides of the same; but for ordinary use a single bearing will be sufficient.

The disk F has radial slots *d*, formed therein, two of these slots being shown in the present instance, and to the face of the disk, adjacent to the rear edge of each slot, is secured a cutting-knife, G, the front or cutting edge of which projects some distance in advance of the rear edge of the slot. The forward portion of the slot in advance of the knife is occupied by a plate, J, on the back of which is a projecting stem, *f*, provided with opposite edge flanges, whereby it is guided on a finger, *g*, projecting from the back of the disk F, this finger being slotted for the reception of the confining-screw *h*, (see Fig. 4,) so that the plate J can be adjusted laterally in respect to the knife, and thus serve as a gage to determine the thickness of the slices cut by said knife.

To the top B of the box, in advance of the axis of the disk F, is secured an inclined spout, K, through which potatoes, turnips, meat, or other substances of comparatively large bulk are fed to the cutting-disk, this spout being provided with a follower, M, by which pressure may be imparted to said substances. In order to feed them through the spout, and in order to provide for the proper guidance of carrots, cucumbers, radishes, and other vegetables of small diameter, said follower is provided with openings *m*, through which such vegetables can be passed in order to subject them to the action of the cutting-knives.

On the back of the disk F is a yoke, *n*, in which can be secured, by means of a set-screw, *p*, the butt-end of a curved blade, N, which projects beyond the periphery of the disk, and serves to cut or slice bread or other material placed upon the top of the box in advance of the disk, the front edge of the loaf or body to be sliced projecting over the slot D, and the thickness of the slices being governed by the adjustment of a gage, *w*, the standard of which is slotted, and is secured to the top of the box by a set-screw, *x*, as shown in Figs. 1 and 3. In this case the disk F is simply vibrated, the projection of the blade N beyond the periphery of the disk being such that the rotation of said disk is not permitted. It will of course be understood that the blade N is removed from the disk when the machine is to be used for cutting meat or vegetables passed through the spout K.

We claim as our invention—

1. The combination of the supporting-frame, the disk and its cutting-knives, a feed-spout, and a follower adapted to said spout and having longitudinal perforations, which serve as guides for directing to the knives objects of small size, all substantially as specified.

2. The combination of a slotted disk having a projecting lug at the rear with a cutting-knife secured to the face of the disk and projecting over the slot, and a gage-plate occupying a position in the slot in advance of the knife, and having a projection guided by and adjustable on the lug at the rear of the disk, all substantially as specified.

3. The disk F, provided with slots, and cutting-knives adjacent thereto, and having a socket and clamp-screw, whereby a projecting supplementary cutting-blade can be secured to the disk, all substantially as specified.

4. The combination of the disk having cutting-knives, a projecting cutting-blade, and means for detachably securing the same to the disk, a frame or table having a slot for the reception of said disk with its knives and cutting-blade, a guide-spout on one side of said slot, and an adjustable gage-plate on the opposite side of the same, all substantially as specified.

FREDERICK W. KOCH.
SAMUEL GARRETT.

Witnesses:
HARRY M. BOYD,
SAML. L. PIETZ.